US012746696B2

(12) United States Patent
Shim et al.

(10) Patent No.: US 12,746,696 B2
(45) Date of Patent: Sep. 29, 2026

(54) SECURITY ROBOT HAVING IMAGE STABILIZATION FUNCTION

(71) Applicant: SEOROBOTICS CO., LTD., Anyang-si (KR)

(72) Inventors: Jae Ik Shim, Seoul (KR); Sung Wook Jo, Suwon-si (KR); Young Jun Lee, Gunpo-si (KR)

(73) Assignee: SEOROBOTICS CO., LTD., Anyang-si (KR)

( * ) Notice: Subject to any disclaimer, the term of this patent is extended or adjusted under 35 U.S.C. 154(b) by 0 days.

(21) Appl. No.: 19/145,838

(22) PCT Filed: Oct. 17, 2023

(86) PCT No.: PCT/KR2023/016028
§ 371 (c)(1),
(2) Date: Jul. 3, 2025

(87) PCT Pub. No.: WO2024/147449
PCT Pub. Date: Jul. 11, 2024

(65) Prior Publication Data

US 2026/0109059 A1 Apr. 23, 2026

(30) Foreign Application Priority Data

Jan. 4, 2023 (KR) ........................ 10-2023-0001289

(51) Int. Cl.
*B25J 19/02* (2006.01)
*B25J 11/00* (2006.01)
(Continued)

(52) U.S. Cl.
CPC ............. *B25J 19/023* (2013.01); *B25J 11/00* (2013.01); *H04N 23/6812* (2023.01); *H04N 23/685* (2023.01); *H04N 23/20* (2023.01)

(58) Field of Classification Search
CPC ........... F16M 11/06–128; B25J 19/023; G03B 17/56–566
See application file for complete search history.

(56) References Cited

U.S. PATENT DOCUMENTS 5,850,579 A * 12/1998 Melby ................ F16M 11/2014
396/428
6,715,940 B2 * 4/2004 Top .................. G08B 13/19619
348/143
10,598,359 B2 * 3/2020 Pannekoek ........... E04H 12/187

FOREIGN PATENT DOCUMENTS

EP 3276250 B1 * 8/2020 ............. F21V 21/03
JP H09-149309 A 6/1997
(Continued)

*Primary Examiner* — Leon W Rhodes, Jr.
(74) *Attorney, Agent, or Firm* — Bridgeway IP Law Group, PLLC; Sang Ho Lee; Hyun Woo Shin

(57) ABSTRACT

Provided is a security robot having an image stabilization function, including: a base plate installed on a security robot; a turn gear disposed under the base plate, and provided with a first hollow portion to allow a cable to pass through; a turn housing rotatably installed on the base plate, provided with the turn gear installed under it, and provided with a second hollow portion through which the cable passes; a turn plate installed on the turn housing, and provided with a fourth hollow portion through which the cable passes; and an electrical and electronic device disposed on the turn plate, wherein power is supplied from a main body of the security robot to the electrical and electronic device and electrical signals are transmitted and received through the cable.

9 Claims, 15 Drawing Sheets

(51) Int. Cl.
*H04N 23/68* (2023.01)
*H04N 23/20* (2023.01)

(56) References Cited

FOREIGN PATENT DOCUMENTS

| | | | |
|---|---|---|---|
| JP | 2006-261931 | A | 9/2006 |
| JP | 2014-006368 | A | 1/2014 |
| KR | 10-0586433 | B1 | 6/2006 |
| KR | 10-2006-0132095 | A | 12/2006 |
| KR | 10-0763521 | B1 | 10/2007 |
| KR | 10-0797449 | B1 | 1/2008 |
| KR | 10-2011-0114975 | A | 10/2011 |
| KR | 10-1190294 | B1 | 10/2012 |
| KR | 10-2021-0057694 | A | 5/2021 |
| KR | 10-2021-0132995 | A | 11/2021 |
| WO | 2021/195641 | A1 | 9/2021 |

* cited by examiner

SECURITY ROBOT HAVING IMAGE STABILIZATION FUNCTION

TECHNICAL FIELD

The present invention relates to a security robot capable of tracking and recording a target while traveling.

BACKGROUND ART

In general, a security robot is equipped with an image camera that can capture video, and when a destination or travel route is designated, it is capable of planning a travel path from a starting point to a destination and moving along the planned path.

Meanwhile, unforeseen obstacles may appear along the planned travel path, so the security robot may be required to travel while avoiding such obstacles.

In addition, the surface of the travel path may be inclined, may include relatively low obstacles such as thresholds or electric wires, may have recessed rails for the installation of flood barriers, and may be uneven in condition.

That is, the security robot may perform movements such as turning left, turning right, or moving straight to avoid obstacles while traveling toward the destination, and may travel in a jostled manner depending on the condition of the road surface. As a result, the orientation and posture of the security robot may continuously change or become unstable.

In addition, the target to be captured may be either stationary or in motion.

That is, if either the security robot or the target is in motion, the image camera must be capable of tracking the target in order to capture it continuously.

Meanwhile, while the security robot is moving, the video captured of the target may become shaky or blurred, resulting in degraded image quality. This causes inconvenience and difficulty in accurately analyzing or interpreting the footage, and increases fatigue for the person who needs to review the video.

On the other hand, electrical and electronic devices such as a camera device may be installed on the security robot, and the camera device may be configured to rotate. Cables may be wired to the electrical and electronic devices, and power supply and electrical signal transmission and reception may be carried out through the cables.

However, to prevent the cables from being damaged due to interference or friction with other components when the camera device rotates, the cables may be formed with a thick sheath or made of a highly durable material. Such a durable configuration may generate resistance to the rotation of the camera device and may hinder the smooth rotation of the camera device.

RELATED ART DOCUMENTS

Patent Documents (Patent Document 1) KR 10-0586433 B1
(Patent Document 2) KR 10-0797449 B1
(Patent Document 3) KR 10-2021-0057694 A

DISCLOSURE

Technical Problem

Therefore, the present invention has been made in view of the above problems, and it is one object of the present invention to provide a security robot having an image stabilization function which allows an image camera to track and capture a target even when the orientation of the security robot and the orientation of the image camera facing the target do not match each other while the security robot is moving.

It is another object of the present invention to provide a security robot having an image stabilization function, in which a cable is arranged to supply power and transmit and receive electrical signals to and from electrical and electronic components that pivot within the security robot, while ensuring the durability of the cable and minimizing or eliminating resistance to the rotation of a camera device.

It is yet another object of the present invention to provide a security robot having an image stabilization function which enables the obtaining of high-quality video by minimizing image shake even while the security robot is capturing video during movement.

Technical Solution

In accordance with an aspect of the present invention, the above and other objects can be accomplished by the provision of a security robot having an image stabilization function, including: a base plate 10 installed on a security robot 1; a turn gear 22 disposed under the base plate 10, and provided with a first hollow portion 23 to allow a cable C to pass through; a turn housing 30 rotatably installed on the base plate 10, provided with the turn gear 22 installed under it, and provided with a second hollow portion 34 through which the cable C passes; a turn plate 70 installed on the turn housing 30, and provided with a fourth hollow portion 72 through which the cable C passes; and an electrical and electronic device disposed on the turn plate 70, wherein power is supplied from a main body of the security robot 1 to the electrical and electronic device and electrical signals are transmitted and received through the cable C.

In addition, the security robot having an image stabilization function according to an embodiment of the present invention may further include a cover shaft 60 installed between an upper side of the turn housing 30 and the turn plate 70, and provided with a third hollow portion 62 through which a cable C passes.

In addition, the turn housing 30 may include: a sheet 32 formed in a disk shape on an outer circumferential surface of the shaft 31; a limit wall 33 formed to protrude from an edge of the sheet 32 in a shape that is open on one side; a turn bracket 40 provided with a boss 41 formed to be fitted onto an outer circumferential surface of the shaft 31, placed on the sheet 32, and provided with a beak 42 formed to protrude from one side of the boss 41, wherein the beak 42 is positioned in an open portion of the limit wall 33, and the turn bracket 40 pivots within a range limited by the beak 42 coming into contact with the limit wall 33; and a stopper block 50 installed on the base plate 10, and configured to limit a rotational range of the turn bracket 40 by coming into contact with the beak 42.

In addition, when viewed from above, a first angle a may be formed by one end of the limit wall 33, a center of the shaft 31, and another end of the limit wall 33; a second angle b may be formed by one side of the beak 42, a center of the shaft 31, and another side of the beak 42; and when a third angle c is formed by one side of the stopper block 50 and another side of the stopper block 50, the first angle a may be 3 to 4 times greater than the second angle b, and the first angle a may be 3 to 4 times greater than the third angle c.

In addition, the security robot having an image stabilization function according to an embodiment of the present invention may include first and second stand blocks 81 and 82 installed on the turn plate 70; a tilty motor 83 installed on the first stand block 81; a tilty block bracket 86 having one side installed on the tilty motor 83 and another side rotatably installed on the second stand block 82; an image camera 92 installed on the tilty block bracket 86; and a gyro sensor 108 installed on the second stand block 82 and configured to measure an orientation change of the second stand block 82, wherein in a state where an absolute tilt value of the tilty block bracket 86 is set such that the image camera 92 is directed toward a target T, the tilty motor 83 is operated in an opposite tilting direction by an amount corresponding to an absolute value of a first tilt angle measured by the gyro sensor 108, so that a tilt of the image camera 92 converges toward the absolute tilt value.

In addition, the security robot having an image stabilization function according to an embodiment of the present invention may further include an angle sensor 104 installed on the second stand block 82, and configured to measure a second tilt angle at which the tilty block bracket 86 is tilted with respect to the second stand block 82, wherein an absolute tilt value of the tilty block bracket 86 is set based on the second tilt angle and the first tilt angle measured by the gyro sensor 108.

In addition, the security robot having an image stabilization function according to an embodiment of the present invention may further include a thermal imaging camera 90 installed on the tilty block bracket 86 to measure a temperature of an object.

In addition, the security robot having an image stabilization function according to an embodiment of the present invention may further include a weight balance 94 installed on the tilty block bracket 86, and configured to align a tilt center of the tilty block bracket 86 with its center of gravity or to minimize weight imbalance.

Specific details of other embodiments are included in the detailed description and the drawings.

Advantageous Effects

A security robot having an image stabilization function according to an embodiment of the present invention can allow an image camera to track and capture a target even when the orientation of the security robot and the orientation of the image camera facing the target do not match each other while the robot is in motion.

In addition, the present invention can minimize image shake even when the security robot travels over an uneven surface and experiences jolting during movement, thereby enabling the acquisition of high-quality video.

DESCRIPTION OF DRAWINGS

FIG. 9 illustrates an example in which the orientation of the security robot and the orientation of the head case are aligned. FIG. 10 illustrates an example in which the head case is rotated to the maximum extent to the right, and FIG. 11 illustrates an example in which the head case is rotated to the maximum extent to the left.

BEST MODE FOR CARRYING OUT THE INVENTION

Figure 1:
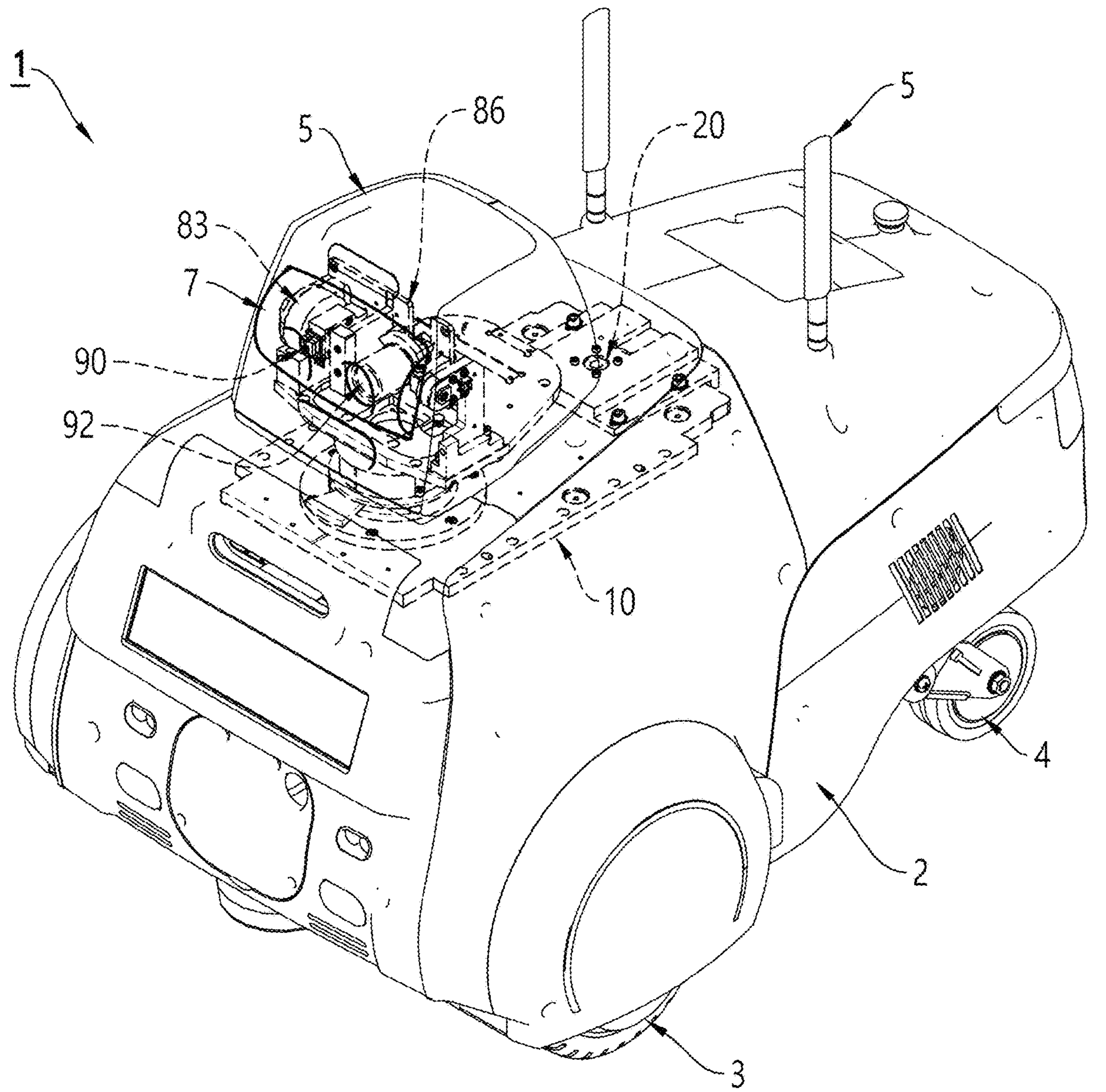
FIGS. 1 and 2 are a perspective view and side view illustrating the overall configuration of the security robot having an image stabilization function according to an embodiment of the present invention.

The advantages and features of the present invention and the method of achieving them will become apparent with reference to the embodiments described in detail below together with the accompanying drawings.

Hereinafter, an embodiment of the present invention will be described in detail with reference to the accompanying drawings. The embodiment described below is provided as examples to help understand the present invention, and it should be understood that the present invention can be implemented in various ways different from the embodiment described herein. However, in the following description of the present invention, a detailed description of known functions and configurations incorporated herein will be omitted when it may make the subject matter of the present invention unclear. In addition, the accompanying drawings are not drawn to their actual scales and some components may be drawn with exaggerated sizes to help understand the invention.

Meanwhile, terms such as first, second, etc. may be used to describe various components, but the components should not be limited by the terms. The terms are used solely for the purpose of distinguishing one component from another. For example, without going beyond the scope of the present invention, the first component may be named the second component, and similarly, the second component may also be named the first component.

On the other hand, the terms described below are terms established in consideration of their functions in the present invention and thus may vary depending on the intention of a producer or custom. Accordingly, the definitions of the terms should be understood on the basis of the entire description of the present specification.

[Description of Symbols]

| | |
|---|---|
| 1: security robot | 2: body |
| 3: main wheels | 4: sub-wheel |
| 5: communication device | 6: head case |
| 7: camera cover | |
| 10: base plate | 20: turn motor |
| 21: motor gear | 22: turn gear |
| 23, 34, 62, 72: first to fourth hollow portions | |
| 24: timing belt | 26, 84: first and second bearings |

-continued

| [Description of Symbols] | |
|---|---|
| 30: turn housing | 31: shaft |
| 32: sheet | 33: limit wall |
| 40: turn bracket | 41: boss |
| 42: beak | 50: stopper block |
| 60: cover shaft | 70: turn plate |
| 81, 82: first and second stand blocks | 83: tilty motor |
| 84: bearing | 86: tilty block bracket |
| 90: thermal imaging camera | 92: image camera |
| 94: weight balance | 100: tilty shaft |
| 101, 102: first and second end parts | 103: stopper pin |
| 104: angle sensor | 108: gyro sensor |
| C: cable | T: target |

MODE FOR CARRYING OUT THE INVENTION

Throughout the specification, like reference numerals denote like elements.

Figure 2:
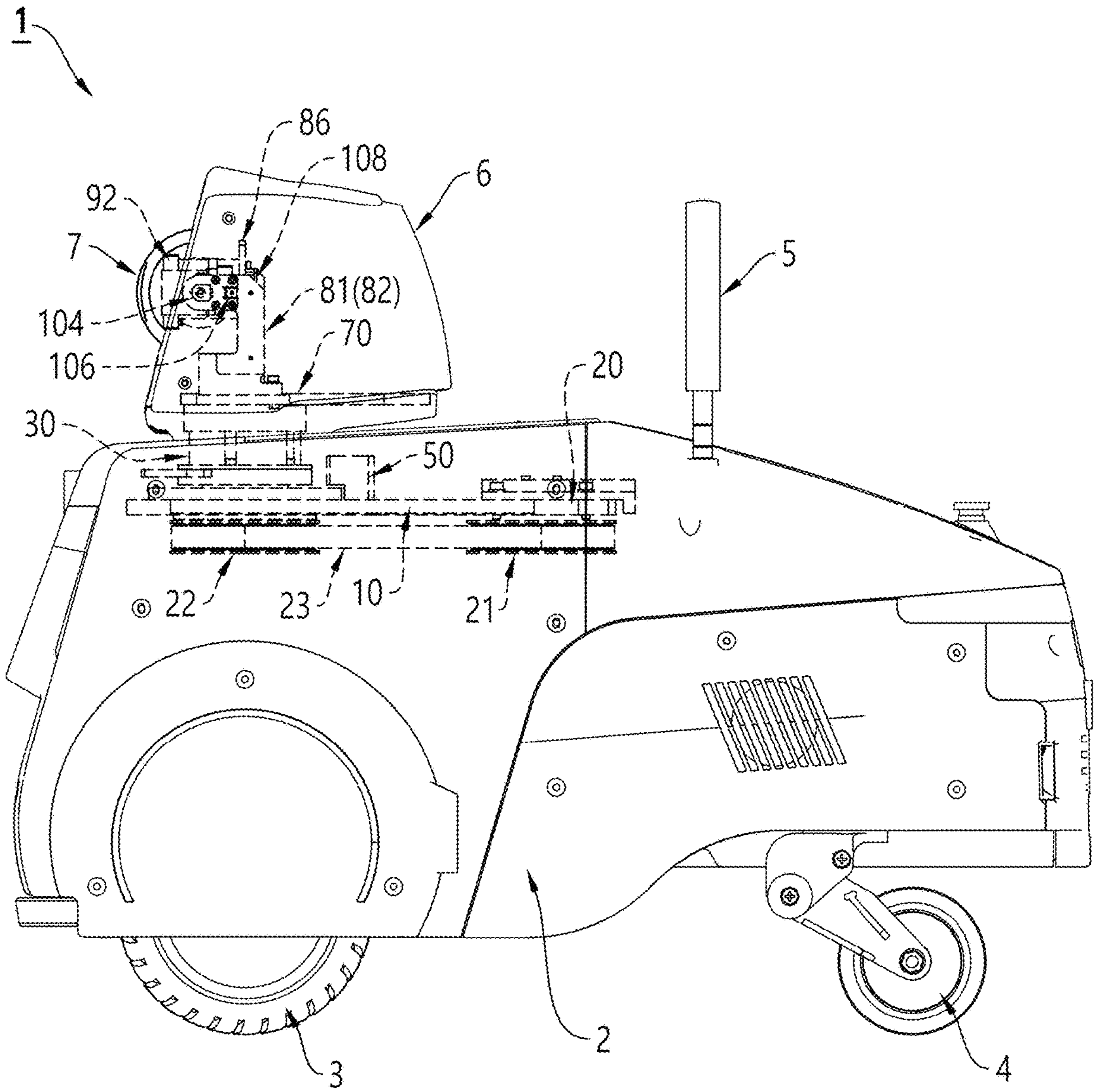

First, the overall configuration of a security robot having an image stabilization function according to an embodiment of the present invention will be described with reference to FIGS. 1 and 2. FIGS. 1 and 2 are a perspective view and side view illustrating the overall configuration of the security robot having an image stabilization function according to an embodiment of the present invention.

As shown in FIGS. 1 and 2, the security robot 1 having an image stabilization function according to an embodiment of the present invention includes a body 2; main wheels 3 and sub-wheel 4 installed at a lower part of the body 2; and a communication device 5 installed on the one side of an upper part of the body 2.

The main wheels 3 are driven by the operation of a driving motor, enabling the security robot 1 to move. In addition, the main wheels 3 are installed on both the left and right sides, and a traveling direction may be changed by controlling the rotational speeds of the left and right main wheels 3 differently. Furthermore, the driving mode may be changed from forward travel to reverse travel by switching between forward and reverse rotation.

The sub-wheel 4 may support the weight of the security robot 1 and may be configured with a spring, suspension, or the like to absorb shock transmitted from road surfaces, thereby reducing the transfer of impact energy to the body 2 of the security robot 1.

The communication device 5 is configured to enable remote communication between the security robot 1 and a control center. The control center allows a monitoring operator to view video captured by a camera and to control the security robot 1.

In addition, as shown in FIGS. 1 and 2, a head case 6 may be installed on the upper part of the body 2, and a camera cover 7 may be installed on the head case 6.

The head case 6 may be installed on a base plate 10 and may be capable of rotating in the left and right directions, similar to the way a human turns their head from side to side.

The camera cover 7 may be installed on a tilty block bracket 86 and may be positioned in front of a thermal imaging camera 90 and an image camera 92. When the tilty block bracket 86 tilts in a vertical direction, the camera cover 7 may tilt together, allowing it to move in a manner similar to how a human looks up and down with their eyes.

Figure 3:
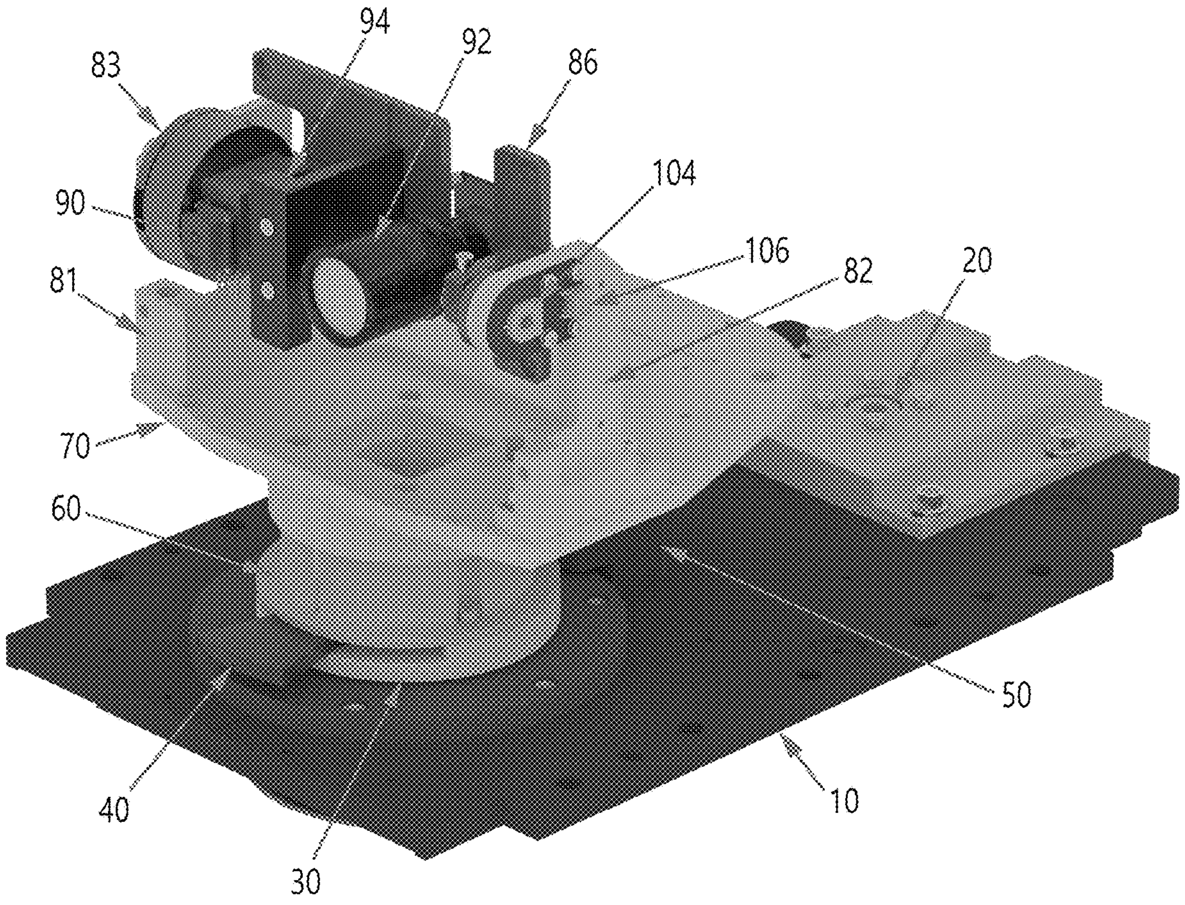
FIGS. 3 to 5 are drawings for explaining main components of the security robot having an image stabilization function according to an embodiment of the present invention.
Figure 4:
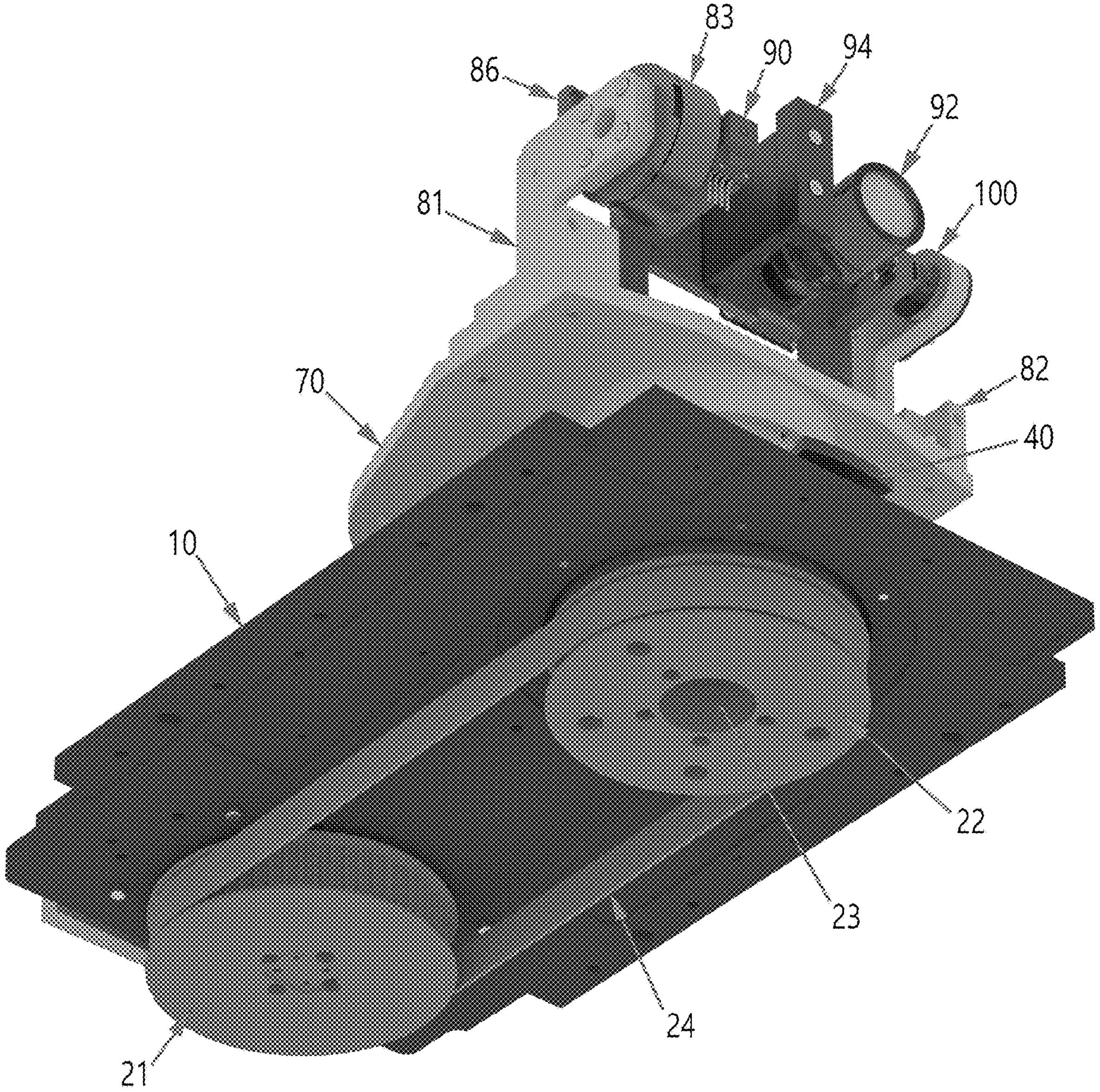
Figure 5:
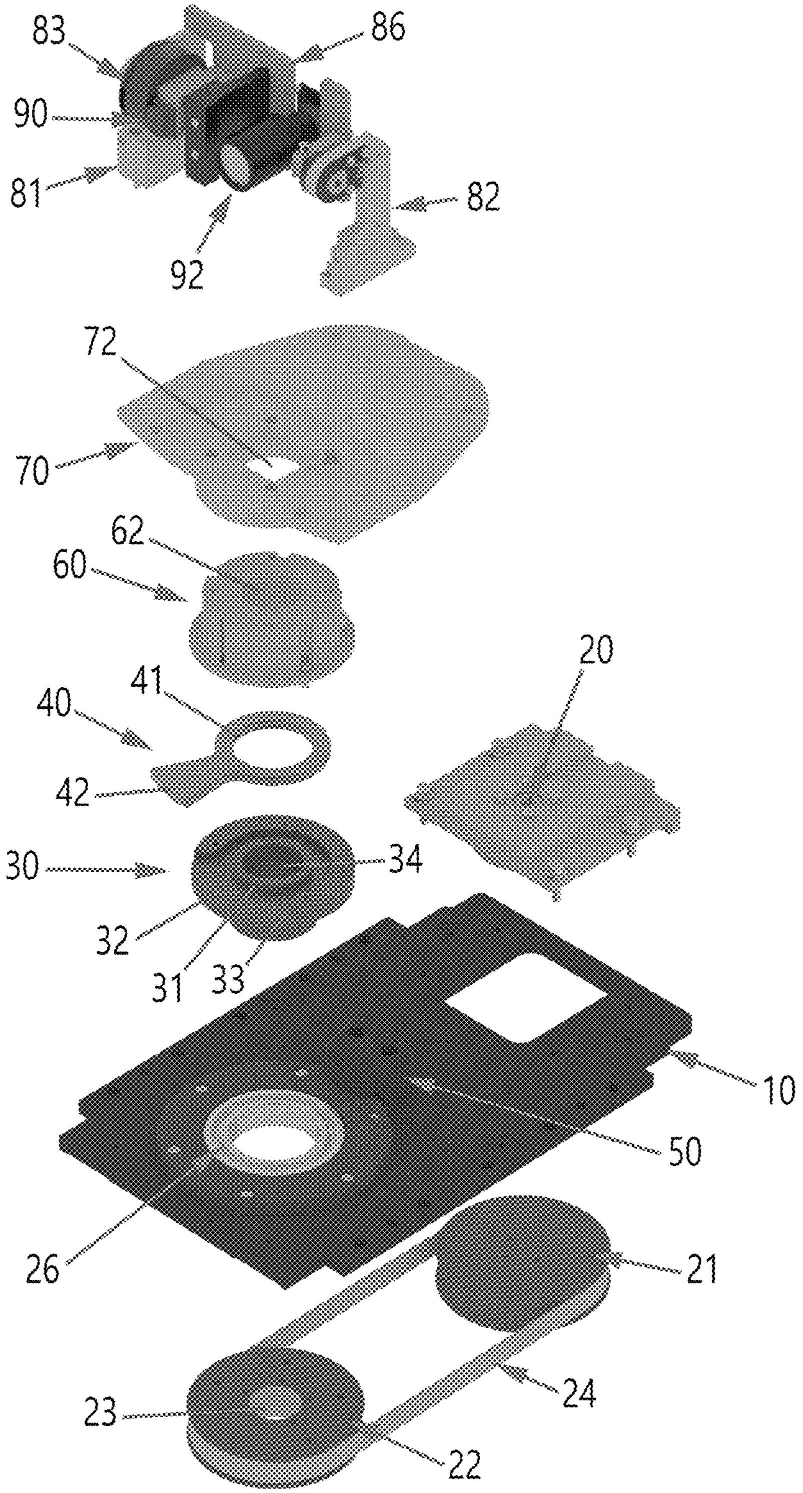
Figure 6:
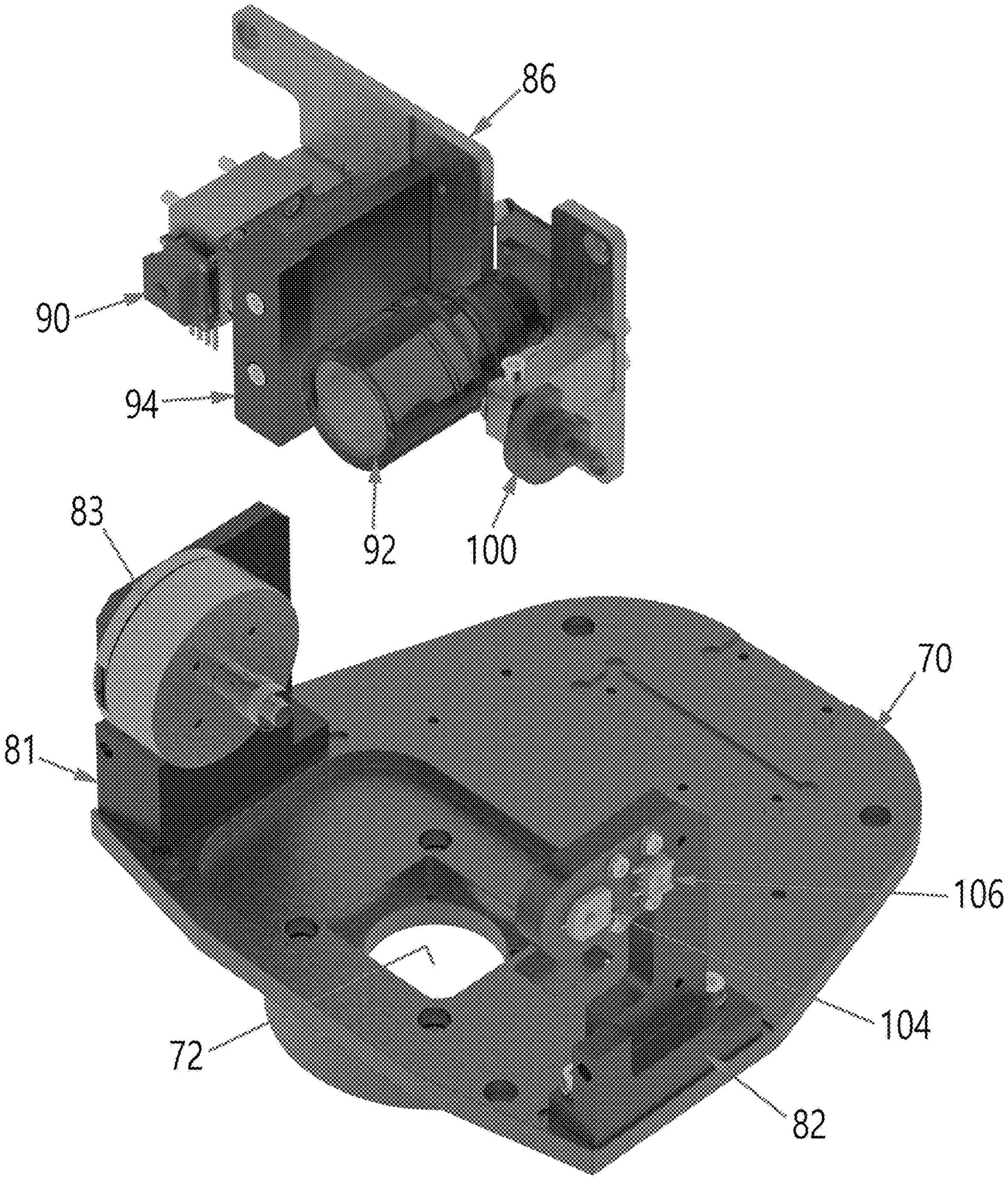
FIGS. 6 and 7 illustrate the main components of the security robot according to an embodiment of the present invention.
Figure 7:
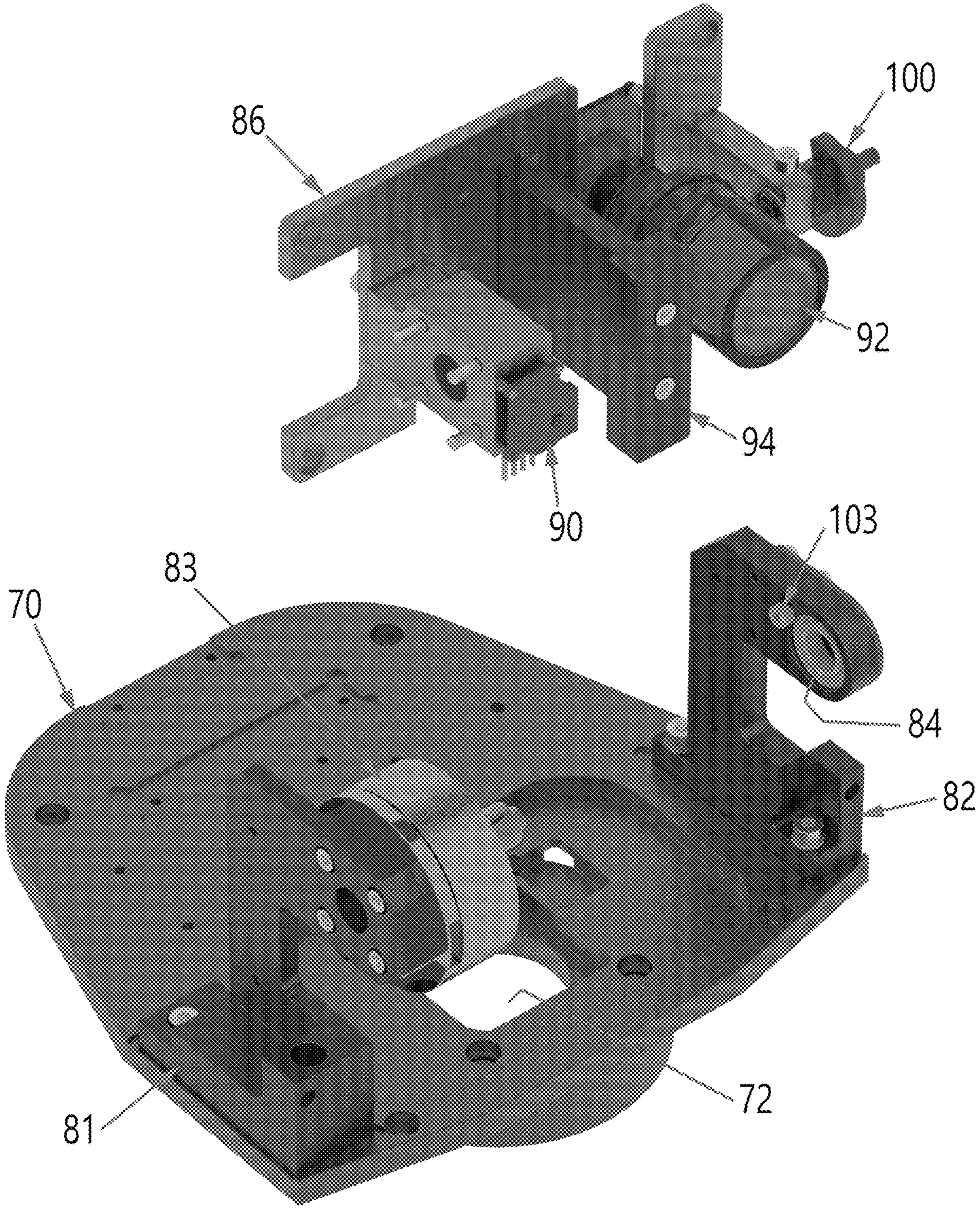
Figure 8:
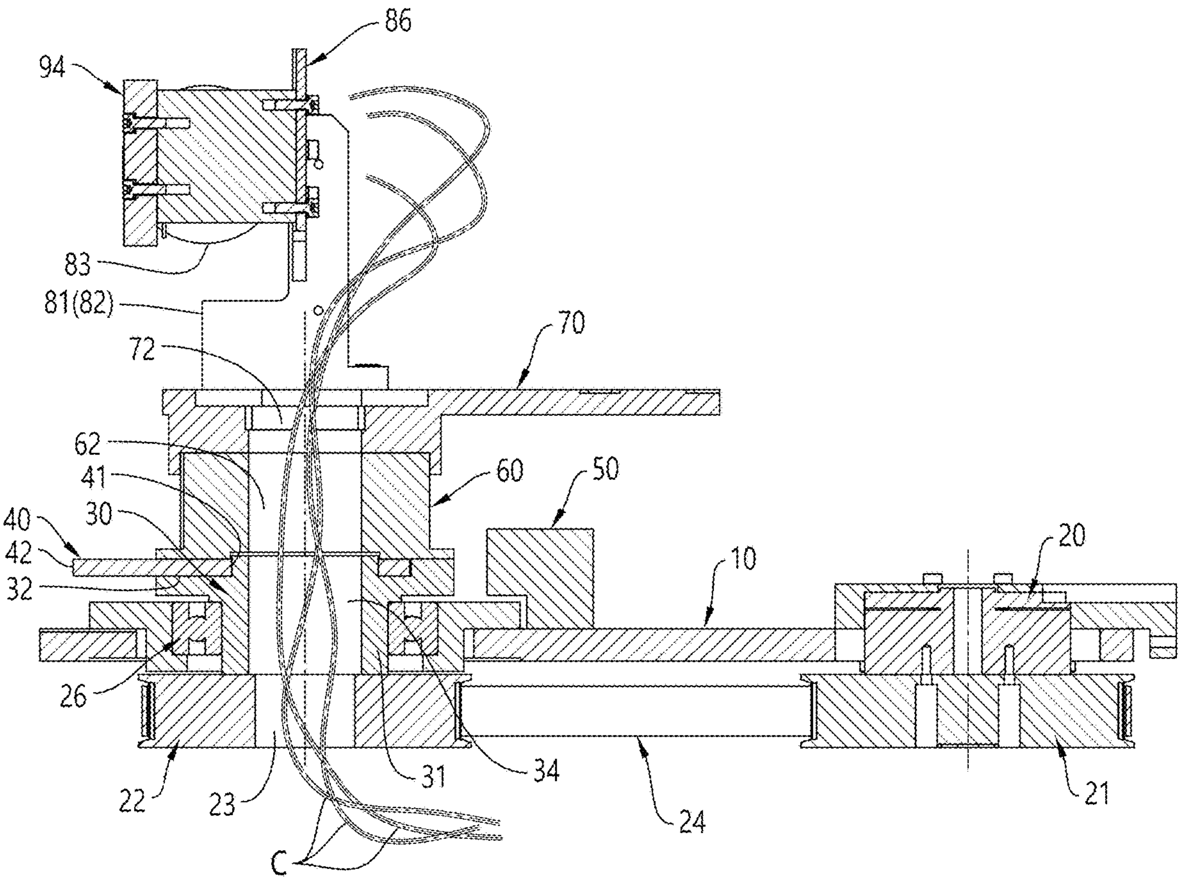
FIG. 8 illustrates a sectional view for explaining the main components of the security robot according to an embodiment of the present invention.
Figure 9:
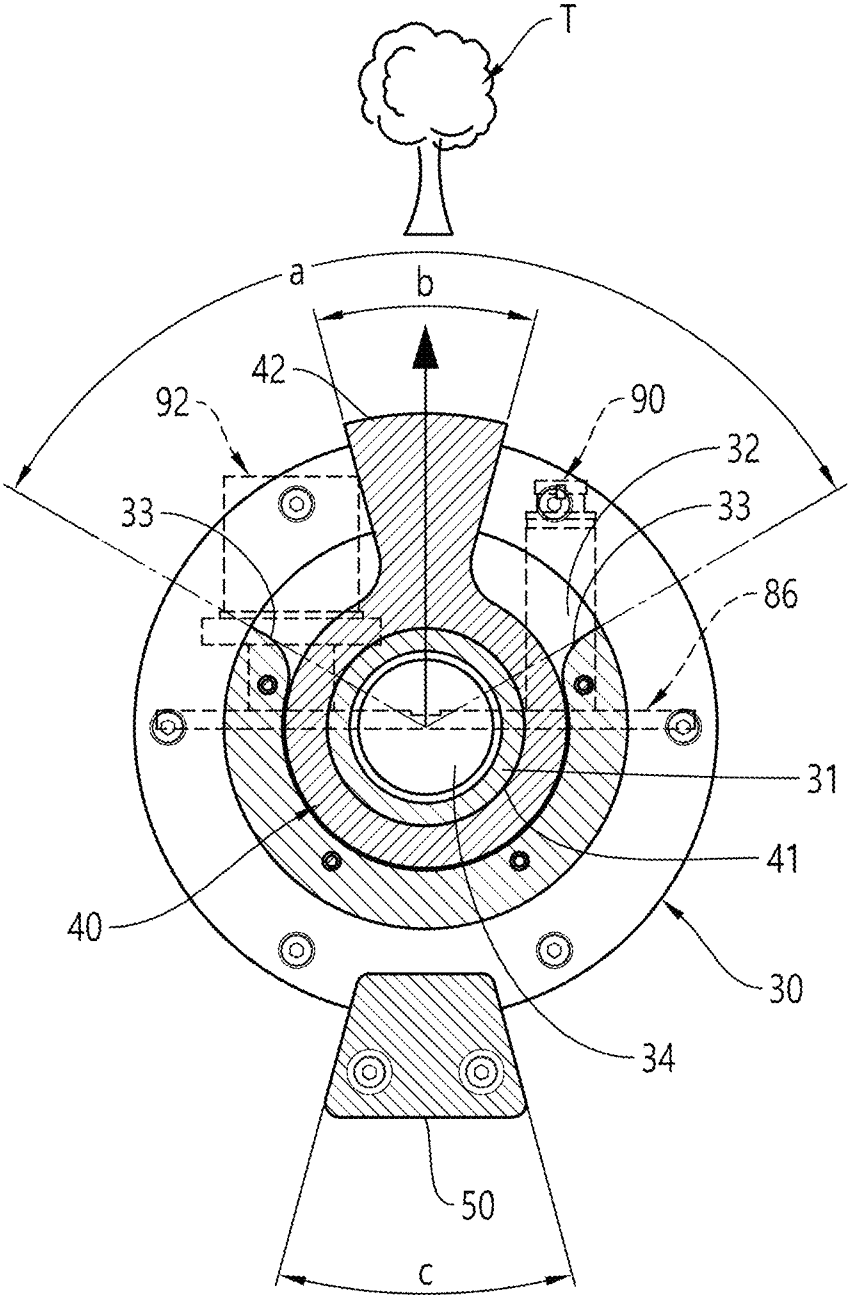
FIGS. 9 to 11 illustrate views for explaining the orientation of a head case in the security robot according to an embodiment of the present invention.
Figure 10:
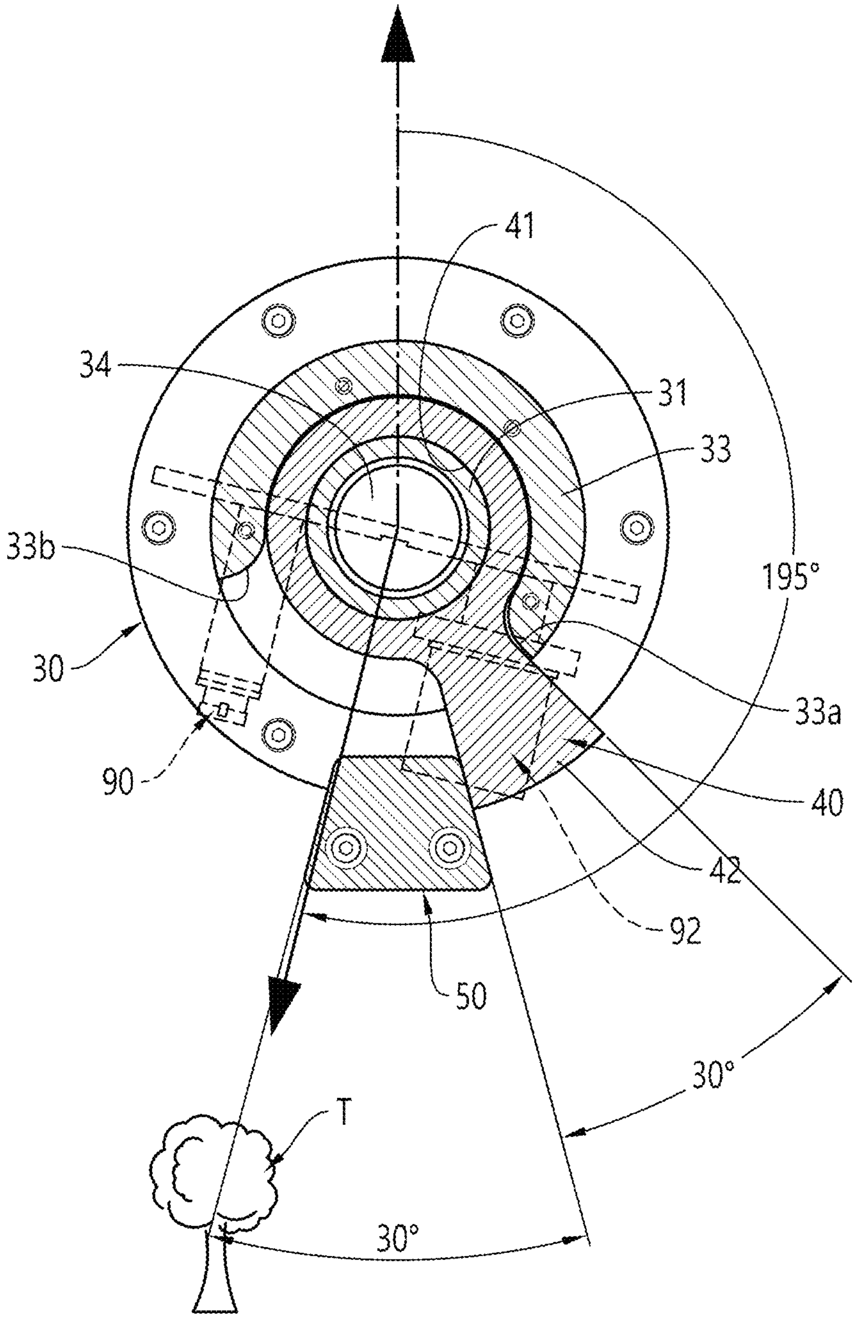
Figure 11:
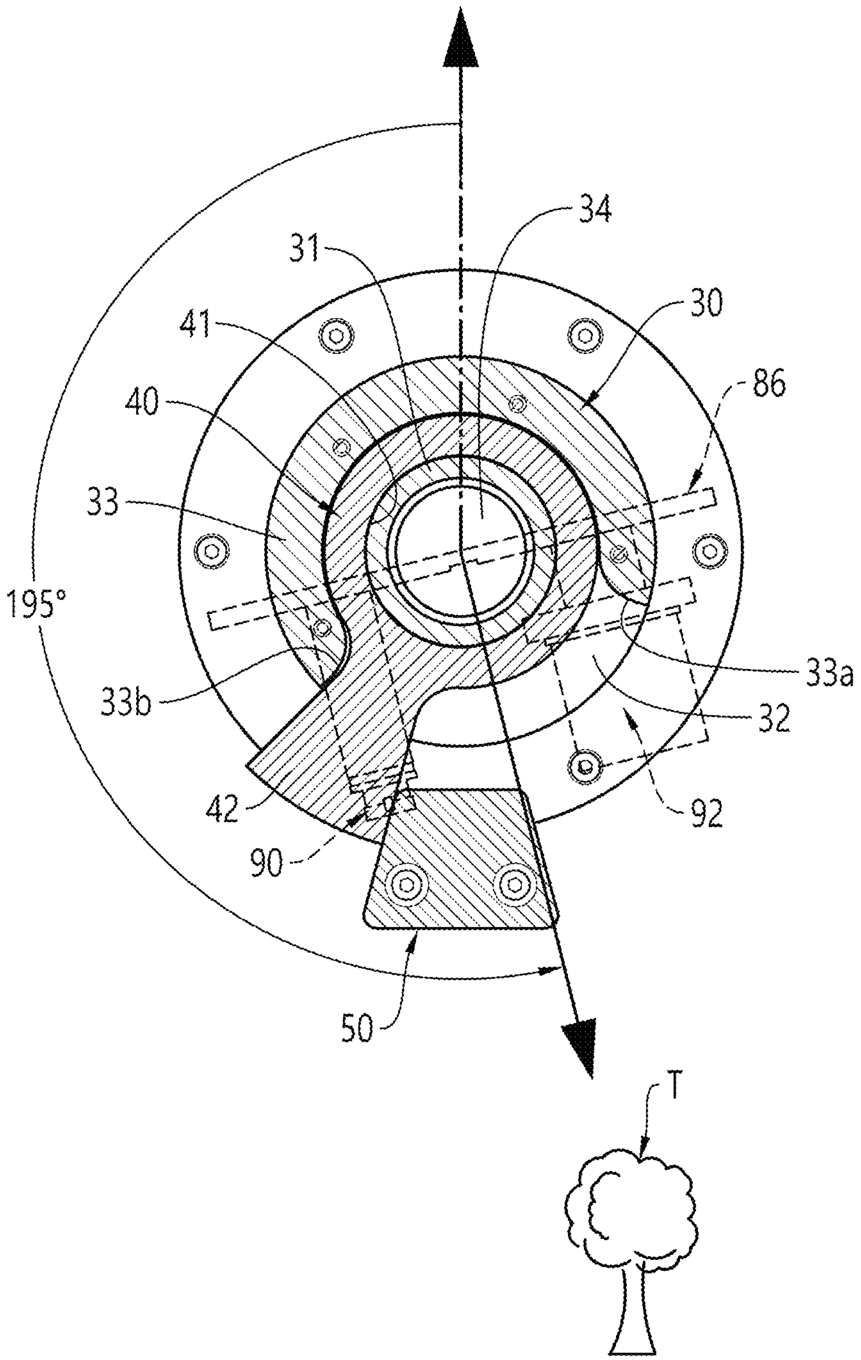
Figure 12:
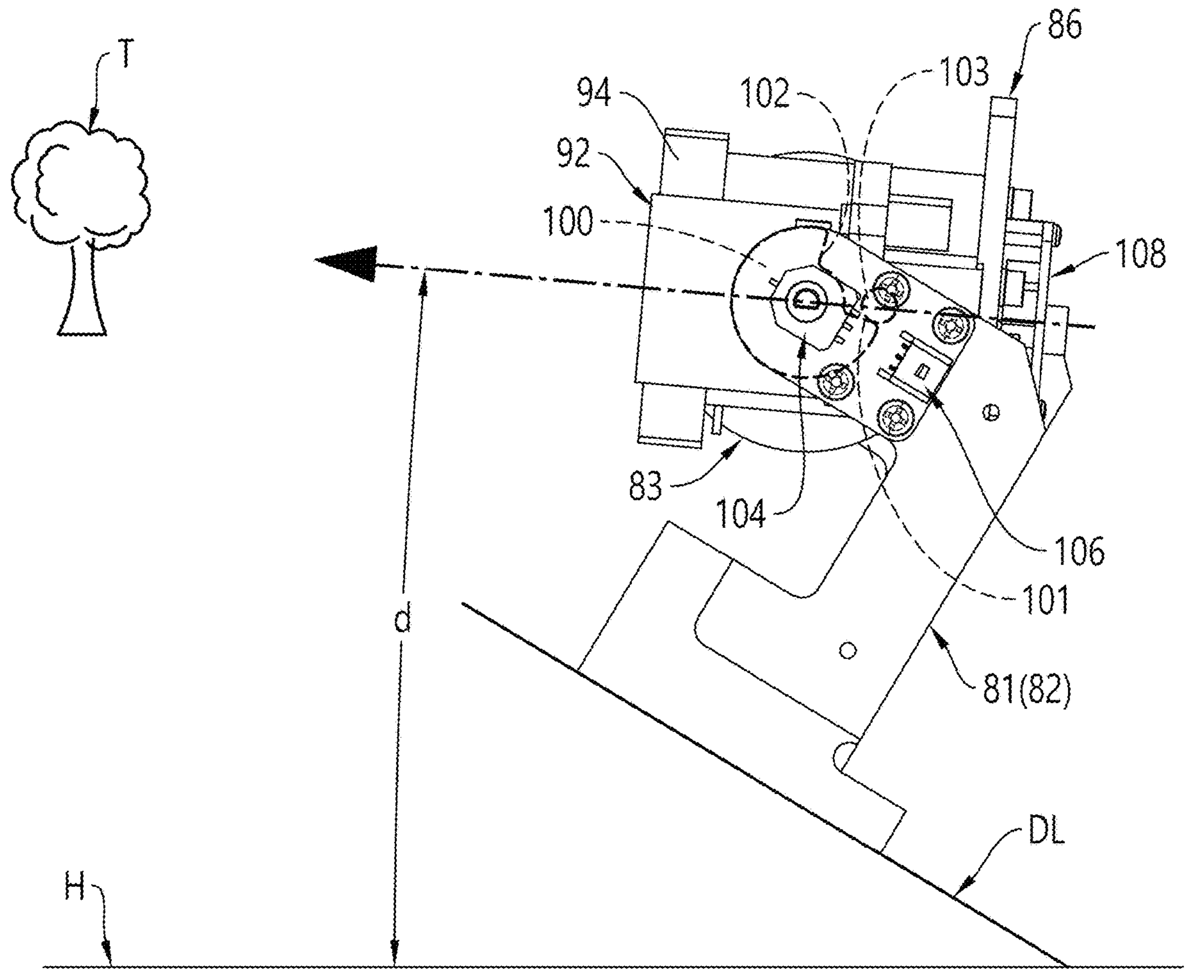
FIG. 12 is an example in which the image camera tracks a target while the security robot is in an ascending posture.
Figure 13:
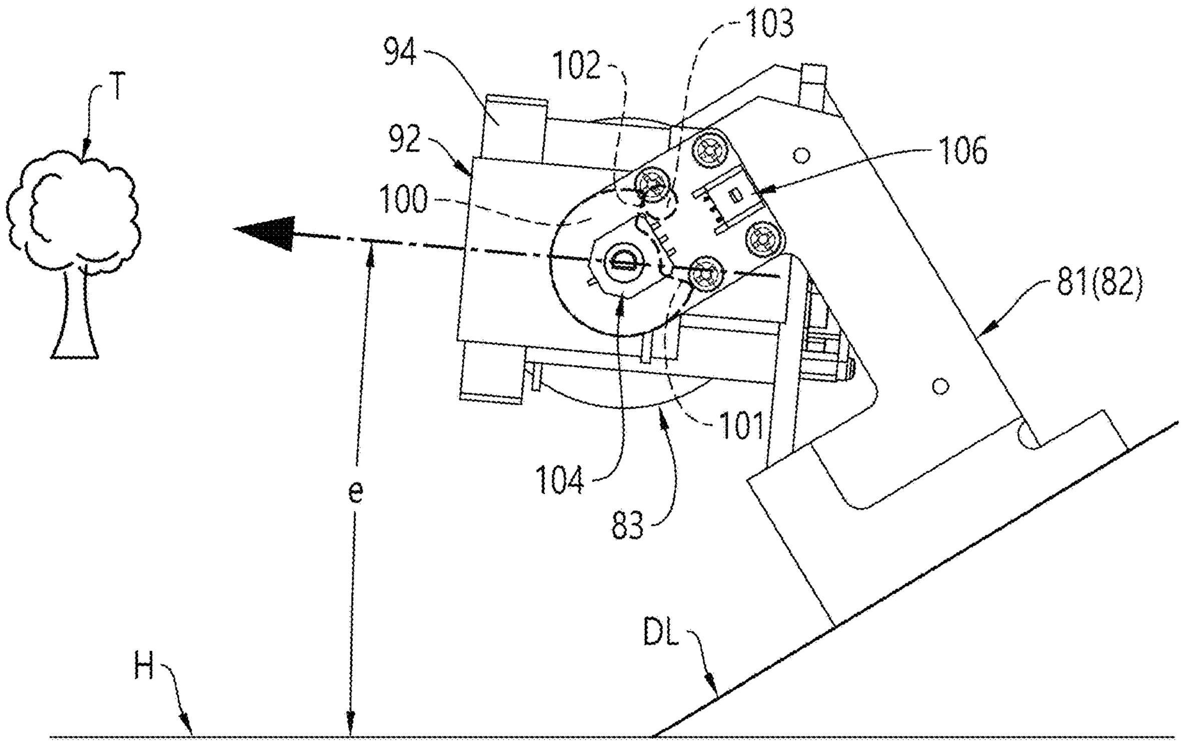
FIG. 13 is an example in which the image camera tracks a target while the security robot is in a descending posture.
Figure 14:
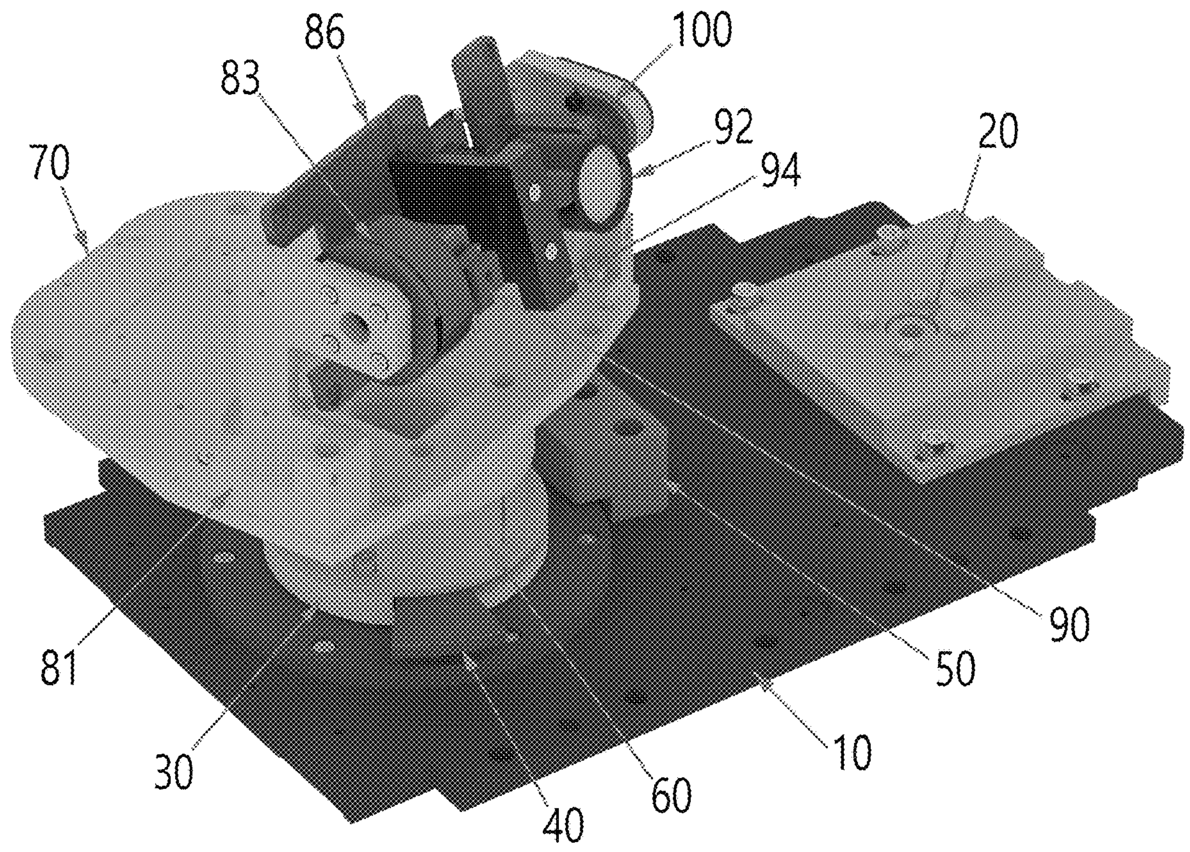
FIGS. 14 and 15 are a perspective view and plan view showing a state in which the image camera is tilted upward while turned to the left in the security robot.
Figure 15:
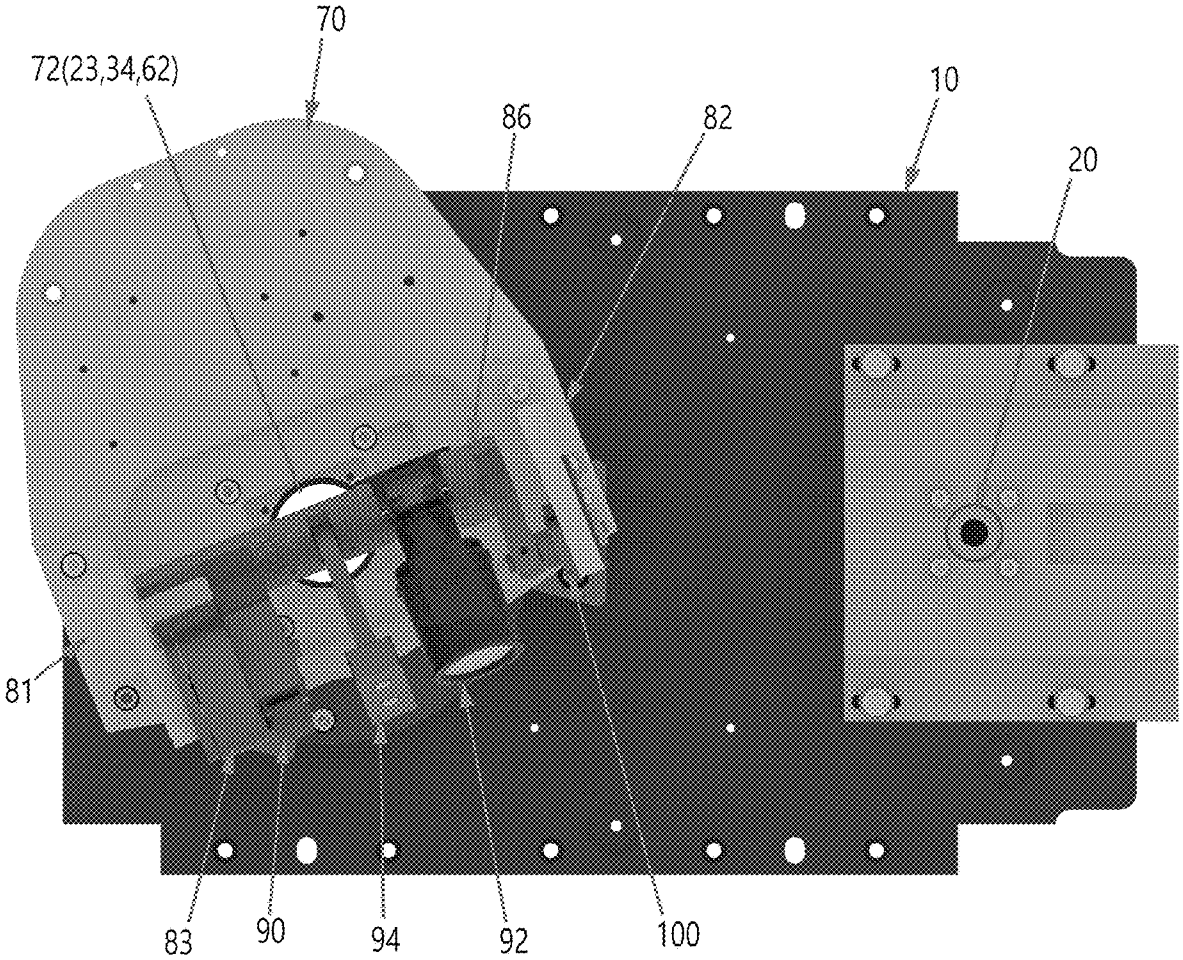

Hereinafter, the configuration, operation, and effects of the security robot having an image stabilization function according to an embodiment of the present invention will be described with reference to FIGS. 3 to 14. FIGS. 3 to 5 are drawings for explaining main components of the security robot according to an embodiment of the present invention. FIGS. 6 and 7 illustrate the main components of the security robot according to an embodiment of the present invention. FIG. 8 illustrates a sectional view for explaining the main components of the security robot according to an embodiment of the present invention. FIGS. 9 to 11 illustrate views for explaining the orientation of a head case in the security robot according to an embodiment of the present invention. FIG. 9 illustrates an example in which the orientation of the security robot and the orientation of the head case are aligned. FIG. 10 illustrates an example in which the head case is rotated to the maximum extent to the right, and FIG. 11 illustrates an example in which the head case is rotated to the maximum extent to the left. FIG. 12 is an example in which the image camera tracks a target while the security robot is in an ascending posture. FIG. 13 is an example in which the image camera tracks a target while the security robot is in a descending posture. FIGS. 14 and 15 are a perspective view and plan view showing a state in which the image camera is tilted upward while turned to the left in the security robot.

The security robot according to an embodiment of the present invention may be configured to include a base plate 10, a turn gear 22, a turn housing 30, a turn plate 70, and an electrical and electronic device.

As shown in FIGS. 1 and 2, the base plate 10 may be fixedly installed on a frame configured inside the body 2 of the security robot 1.

A turn motor 20 may be installed on the base plate 10. More specifically, the turn motor 20 may be installed on a bracket, and the bracket may be installed on the base plate 10. A mounting hole may be formed as an elongated slot, so that the installation position of the turn motor 20 may be adjusted within the length range of the slot on the base plate 10.

A motor gear 21 may be installed on the motor shaft of the turn motor 20, and the turn motor 20 may be numerically controlled.

The turn gear 22 may be disposed under the base plate 10, and a first hollow portion 23 may be formed to allow a cable C to pass through.

The motor gear 21 and the turn gear 22 may be connected by a timing belt 24, so that the power of the turn motor 20 may be transmitted thereto.

Meanwhile, the tension of the timing belt 24 may be adjusted by adjusting the installation position of the turn motor 20. That is, after the turn motor 20 may be temporarily mounted on the base plate 10 and the timing belt 24 is installed, the turn motor 20 may be moved in a direction opposite to the turn gear 22 and then fixedly installed on the base plate 10.

That is, the turn gear 22 is not directly connected to the turn motor 20, but is configured to receive power through the timing belt 24, thereby allowing the first hollow portion 23 to be formed in the turn gear 22.

The turn housing 30 may be rotatably installed on the base plate 10, and the turn gear 22 may be installed on the lower side of the turn housing 30.

More particularly, a first bearing 26 may be installed on the base plate 10, and the turn housing 30 may be mounted on the first bearing 26, so that the turn housing 30 may freely rotate on the base plate 10.

Meanwhile, as shown in FIG. 8, the turn gear 22 is disposed at the lower part of the turn housing 30, and the turn housing 30 and the turn gear 22 may be fixed together using fastening means such as a bolt.

In addition, as shown in FIGS. 5 and 8, the turn housing 30 may be formed with a second hollow portion 34 to allow the cable C to pass through.

As shown in FIGS. 4 and 8, the turn plate 70 may be installed on the upper side of the turn housing 30, and a fourth hollow portion 72 may be formed to allow the cable C to pass through.

The electrical and electronic device may be configured to include a tilty motor 83, the thermal imaging camera 90, the image camera 92, an angle sensor 104, a data processing connector 106 and a gyro sensor 108.

The electrical and electronic device may be disposed on the upper side of the turn plate 70, as shown in FIGS. 3 and 4.

As shown in FIG. 8, the cable C may be arranged to pass through the first, second, and fourth hollow portions 23, 34, and 72, may provide power from the main body of the security robot 1 to the electrical and electronic device and may transmit and receive electrical signals.

As described above, the security robot according to an embodiment of the present invention may operate the turn motor 20 to adjust the orientation of the turn plate 70, even if the orientation of the image camera 92 facing a target T does not match the orientation of the security robot 1 while the security robot 1 is moving. As a result, the image camera 92 can photograph the target T while tracking it.

In addition, as shown in FIG. 8, the cable C may be arranged to pass through the turn gear 22, the turn housing 30, and the turn plate 70, so that even when the turn gear 22, the turn housing 30, and the turn plate 70 rotate, the cable C does not become excessively twisted, and the cable C exerts little resistance or influence on the turning motion of the turn gear 22, the turn housing 30, and the turn plate 70.

Meanwhile, as shown in FIGS. 3, 5, and 8, a cover shaft 60 may further be installed between the upper side of the turn housing 30 and the turn plate 70. The cover shaft 60 may be formed with a third hollow portion 62 to allow the cable C to pass through.

The cover shaft 60 may increase the distance between the turn housing 30 and the turn plate 70, thereby providing the effect of reducing the torsional stress that occurs when the cable C twists during rotation. As a result, it may prevent damage to the sheath of the cable C caused by friction between segments of the cable C, and may also reduce the fatigue stress accumulated in the cable C.

In addition, the cover shaft 60 may have the effect of preventing a turn bracket 40, which will be described below, from unintentionally detaching from the turn housing 30.

Meanwhile, the security robot according to an embodiment of the present invention may further be configured to include a turn bracket 40 and a stopper block 50, as shown in FIG. 5.

As shown in FIG. 5, the turn housing 30 includes a disk-shaped sheet 32 formed on the outer circumferential surface of a shaft 31. A limit wall 33 is formed at the edge of the sheet 32, and the limit wall 33 protrudes in a shape where one side is open.

The turn bracket 40 includes a boss 41 formed to be fitted onto the outer circumferential surface of the shaft 31, and a beak 42 is formed to protrude from one side of the boss 41.

As shown in FIGS. 3 and 8, the turn bracket 40 is placed on the sheet 32.

As shown in FIGS. 3 and 9, the beak 42 is positioned in the open portion of the limit wall 33.

The turn bracket 40 may pivot in the turn housing 30 within a range before the beak 42 comes into contact with the limit wall 33.

The stopper block 50 may be installed on the base plate 10, and may come into contact with the beak 42 to limit the rotation range of the turn bracket 40.

The operation and effects of the turn housing 30 and the turn bracket 40 will be described in detail with reference to FIGS. 9 to 11.

FIG. 9 illustrates an example in which the orientation of the security robot 1 and the orientation of the image camera 92 are aligned, and the image camera 92 is directed toward a target T located in front of the security robot 1.

FIG. 10 illustrates an example in which the turn housing 30 is rotated in a clockwise direction. When the turn housing 30 rotates clockwise, a first end 33*a* of the limit wall 33 comes into contact with the beak 42, whereby the turn housing 30 rotates clockwise while pushing the turn bracket 40. Next, when the beak 42 comes into contact with the stopper block 50, the clockwise rotational movement of the turn housing 30 and the turn bracket 40 may be stopped, and the range of rotational movement may be limited.

FIG. 11 illustrates an example in which the turn housing 30 is rotated in a counterclockwise direction. When the turn housing 30 rotates counterclockwise, a second end 33*b* of the limit wall 33 comes into contact with the beak 42, whereby the turn housing 30 rotates counterclockwise while pushing the turn bracket 40. Next, when the beak 42 comes into contact with the stopper block 50, the counterclockwise rotational movement of the turn housing 30 and the turn bracket 40 may be stopped, and the range of rotational movement may be limited.

Since the turn housing 30, the cover shaft 60, and the turn plate 70 are fixed to each other, the orientation of the turn housing 30 is the same as the orientation of the turn plate 70.

Meanwhile, it is conceivable to configure a system without the turn bracket 40 by allowing a portion of the turn housing 30 to come into contact with the stopper block 50, thereby limiting the rotation range of the turn housing 30. In such a configuration, the turn housing 30 is not able to rotate by an amount corresponding to the width of the stopper block 50.

However, the security robot according to an embodiment of the present invention is configured with the turn bracket 40 as described above, so that the turn housing 30 may pivot clockwise or counterclockwise beyond the stopper block 50, up to the range where the turn bracket 40 comes into contact with the stopper block 50. As a result, blind spots in the photographing range may be eliminated.

The rotational range of the turn housing 30 will be described in more detail with reference to FIGS. 9 to 11.

A first angle a is defined as an angle formed by one end of the limit wall 33, the center of the shaft 31, and the other end of the limit wall 33 when the turn housing 30 is viewed from above.

A second angle b is defined as an angle formed by one side of the beak 42, the center of the shaft 31, and the other side of the beak 42 when the turn housing 30 is viewed from above.

A third angle c is defined as an angle formed by one side of the stopper block 50 and the other side of the stopper block 50 when the turn housing 30 is viewed from above.

The first angle a may be 3 to 4 times greater than the second angle b, and the first angle a may be 3 to 4 times greater than the third angle c.

For example, if the first angle a is 120 degrees, the second angle b and the third angle c may each be 30 degrees. In this case, when rotated to the maximum extent in the clockwise direction from a forward-facing position as shown in FIG. 10, the rotational range may reach 195 degrees.

In addition, when rotated to the maximum extent in the counterclockwise direction from a forward-facing position as shown in FIG. 11, the rotational range may reach 195 degrees.

That is, the turn housing 30 may be capable of rotating within a range of 390 degrees, and thus, the security robot according to an embodiment of the present invention may have the effect of capturing images in all 360 directions without blind spots.

In addition, the security robot according to an embodiment of the present invention may prevent the cable C from twisting more than approximately 1.1 full turns, as the rotational range of the turn housing 30 is limited.

On the other hand, the security robot according to an embodiment of the present invention may be configured to include first and second stand blocks 81 and 82, the tilty motor 83, the tilty block bracket 86, the image camera 92, the angle sensor 104 and the gyro sensor 108, as shown in FIGS. 3 to 7.

The first and second stand blocks 81 and 82 may be installed on the upper part of the turn plate 70.

The tilty motor 83 may be installed on the first stand block 81 and may be numerically controlled.

One side of the tilty block bracket 86 may be installed on the tilty motor 83, and the other end thereof may be rotatably installed on the second stand block 82.

A second bearing 84 may be installed on the second stand block 82, and a tilty shaft 100 may be installed on the second bearing 84.

As shown in FIGS. 6 and 7, the tilty shaft 100 may be installed on the tilty block bracket 86.

That is, the tilty block bracket 86 may perform a tilting motion about the tilty shaft 100 when the tilty motor 83 operates.

The image camera 92 may be installed on the tilty block bracket 86 and may be configured to capture general video images. The captured video data may be transmitted to a control center through a communication device.

The angle sensor 104 may be installed on the second stand block 82 and measures the tilt angle of the tilty shaft 100 in the front-rear direction.

The gyro sensor 108 may be installed on one side of the tilty block bracket 86, thereby enabling precise measurement of the directional change of the tilty block bracket 86. Furthermore, since the image camera 92 moves together with the tilty block bracket 86, the gyro sensor 108 may ultimately measure the directional change of the image camera 92 with high precision.

The security robot according to an embodiment of the present invention may be configured such that an absolute tilt value of the tilty block bracket 86 is set to allow the image camera 92 to face the target T.

The security robot 1 may be positioned on a flat surface, as shown in FIG. 2; in a front-raised state, i.e., ascending a slope, as shown in FIG. 12; or in a rear-raised state, i.e., descending a slope, as shown in FIG. 13.

The security robot according to an embodiment of the present invention may be configured such that, once a target T to be captured is determined, an absolute tilt value of the tilty block bracket 86 is set so that the target T is positioned at the most appropriate location within an image to be captured.

Since the image camera 92 is fixed to the tilty block bracket 86, the image camera 92 tilts together with the tilty block bracket 86 when the tilty block bracket 86 tilts.

Thereafter, while the security robot 1 is traveling, the main wheels 3 or the sub-wheel 4 may jolt as they pass over a step, and the tilt angle may change momentarily when the security robot 1 passes over an obstacle. Such jolting and sudden changes in tilt may negatively affect image quality.

The security robot according to an embodiment of the present invention may operate the tilty motor 83 in an opposite tilting direction by an amount corresponding to an absolute value of a first tilt angle measured by the gyro sensor 108, so that the tilt of the image camera 92 may converge toward the absolute tilt value.

For example, if the absolute tilt value is 2 degrees (see reference symbol d) when the image camera 92 is directed toward the target T, and the gyro sensor 108 detects that the front of the security robot 1 is tilted upward by 10 degrees, the tilty motor 83 may operate to lower the tilty block bracket 86 by 10 degrees toward the front. As a result, the absolute tilt value of 2 degrees may be maintained, and the image camera 92 may continue to photograph the target T without losing it.

In addition, when the security robot 1 travels over an uneven surface, the gyro sensor 108 may calculate in real-time the tilt angle and direction where the tilty block bracket 86 should be tilted, and the tilty motor 83 may operate in real-time accordingly. As a result, even if an impact causes the security robot 1 to tilt forward or backward, the image camera 92 may continue to photograph the target T without losing it.

Meanwhile, the security robot according to an embodiment of the present invention may be configured to further include the angle sensor 104, as shown in FIGS. 3, 12 and 13.

The angle sensor 104 may be installed on the second stand block 82 and may measure a second tilt angle at which the tilty block bracket 86 is tilted with respect to the second stand block 82.

As a result, the absolute tilt value of the tilty block bracket 86 may be set based on the second tilt angle measured by the angle sensor 104 and the first tilt angle measured by the gyro sensor 108.

For example, if the second tilt angle is measured as +3 degrees in a state where the security robot 1 is standing upright on a flat surface, the absolute tilt value of the tilty block bracket 86 may be +3 degrees.

In another example, if the security robot 1 is on an inclined surface in an ascending posture, the second tilt angle is measured as +3 degrees, and the orientation angle measured by the gyro sensor 108 is +2 degrees relative to a horizontal plane H, the absolute tilt value of the tilty block bracket 86 may be +5 degrees (see reference symbol d).

In still another example, if the security robot 1 is on an inclined surface in a descending posture, the second tilt angle is measured as +3 degrees, and the gyro sensor 108 measures −2 degrees, the absolute tilt value of the tilty block bracket 86 may be +1 degree (see reference symbol e).

On the other hand, a first end part 101 and a second end part 102 may be formed on one side of the tilty shaft 100, a stopper pin 103 may be installed on the second stand block 82, and as the tilty shaft 100 performs a tilting rotational movement, the first end part 101 or the second end part 102 may come into contact with the stopper pin 103, as shown in FIGS. 12 and 13.

FIG. 12 illustrates an example in which the first end part 101 comes into contact with the stopper pin 103, representing a state in which the image camera 92 is tilted downward to its maximum extent.

FIG. 13 illustrates an example in which the second end part 102 comes into contact with the stopper pin 103, representing a state in which the image camera 92 is raised to its maximum extent.

Accordingly, in the security robot according to an embodiment of the present invention, the tilting rotational movement of the tilty shaft 100 may be stopped when the first end part 101 or the second end part 102 comes into contact with the stopper pin 103, thereby physically limiting the tilt angle range of the tilty shaft 100.

Meanwhile, the angle sensor 104 may measure the absolute tilt value of the tilty shaft 100, and thus, just before the first and second end parts 101 and 102 physically contact the stopper pin 103, the forward and backward tilt limit of the image camera 92 may be controlled through software to prevent physical impact.

On the other hand, the security robot according to an embodiment of the present invention may be configured to further include a thermal imaging camera 90, as shown in FIGS. 2 to 7.

The thermal imaging camera 90 may be installed on the tilty block bracket 86 and may measure the temperature of an object. The measured temperature value may be combined with a general video captured by the image camera, allowing the identification of the amount of heat generated by a specific object.

Through the video captured by the thermal imaging camera 90, areas with abnormally high temperatures may be detected in advance, thereby contributing to the prevention of fire by estimating the possibility of fire occurrence beforehand.

In addition, the thermal imaging camera 90 may be used to measure a person's body temperature without contact, and by identifying individuals with abnormally high temperatures, it may contribute to preventing the spread of infectious diseases.

On the other hand, the security robot according to an embodiment of the present invention may be configured to further include a weight balance 94, as shown in FIGS. 3 to 7.

The weight balance 94 may be installed on the tilty block bracket 86.

The weight balance 94 may be configured to align the tilt center of the tilty block bracket 86 with its center of gravity or to minimize weight imbalance.

Multiple components such as the thermal imaging camera 90, the image camera 92, the camera cover 7, and bolts and nuts may be mounted on the tilty block bracket 86. As a result, the center of gravity may differ from the tilt center of the tilty block bracket 86, a significant weight imbalance may occur, and when the tilty motor 83 operates, a substantial load may be applied to the tilty motor 83.

However, by installing the weight balance 94 on the tilty block bracket 86 to have an appropriate weight at an appropriate position, the weight imbalance may be eliminated or minimized. As a result, when the tilty motor 83 operates to tilt the tilty block bracket 86, the load on the tilty motor 83 may be significantly reduced, and furthermore, the tilty motor 83 may respond more quickly and efficiently.

In particular, while the security robot 1 is traveling, jolting or shaking caused by external factors may be detected by the gyro sensor 108. As described above, the tilty motor 83 may quickly operate in the opposite tilting direction by an amount corresponding to the absolute value of the first tilt angle measured by the gyro sensor 108, so that the tilt of the image camera 92 may converge toward the absolute tilt value. As a result, the video captured by the image camera 92 may have little to no shaking, or the shaking may be minimized, thereby improving image quality.

In addition, since the weight balance 94 has mass and is influenced by inertia, it may become less sensitive to external shocks acting on the security robot 1, even when the robot jolts or shakes. In particular, it may slow down the tilting motion of the tilty block bracket 86 in the vertical direction, thereby preventing abrupt shaking of the video and enabling the image to be captured more clearly.

Meanwhile, the weight imbalance may be set to 0.1 kgf or less, so that it does not place a load on the tilty motor 83. As a result, when the tilty motor 83 operates, the tilty block bracket 86 may respond quickly, enabling it to start a movement from a stationary state.

While exemplary embodiments of the present invention have been described above with reference to the accompanying drawings, it will be understood by those skilled in the art that the present invention may be implemented in various other specific forms without departing from the technical spirit or essential characteristics of the invention.

Therefore, the embodiments described above are to be understood as illustrative and not restrictive in all respects. The scope of the present invention is defined by the claims set forth below, and all modifications or variations derived from the meaning, scope, and equivalents of the claims should be construed as being included within the scope of the present invention.

INDUSTRIAL APPLICABILITY

A security robot having an image stabilization function according to an embodiment of the present invention can be used to capture the video of a target object with high quality while traveling over an uneven surface.

The invention claimed is:

1. A security robot with image stabilization function comprising:
- a base plate installed in the security robot;
- a turn gear disposed below the base plate, having a first hollow portion formed to allow passage of a cable;
- a turn housing rotatably installed on the base plate, the turn gear being installed on a lower portion thereof, and having a second hollow portion formed to allow passage of the cable;
- a turn plate installed on an upper portion of the turn housing, having a fourth hollow portion formed to allow passage of the cable; and
- an electric/electronic device disposed above the turn plate;
- wherein power is supplied from a main body of the security robot to the electric/electronic device and electrical signals are transmitted and received via the cable;
- wherein the turn housing comprises:
- a sheet formed in a disk shape on an outer circumferential surface of a shaft;
- a limit wall formed to protrude from the edge of the sheet in a shape that is open on one side;
- a boss fitted to the outer circumferential surface of the shaft, seated on the sheet, having a beak protruding from one side of the boss, the beak being disposed in the open portion of the limit wall, and the beak rotating at an angular range limited to a region in which it contacts the limit wall; and
- a stopper block installed on the base plate and contacting the beak to limit the rotation range of the turn bracket.

2. The security robot with image stabilization function of claim 1,
further comprising a cover shaft disposed between the upper portion of the turn housing and the turn plate,
wherein the cover shaft has a third hollow portion formed to allow passage of the cable.

3. The security robot with image stabilization function of claim 1,
wherein, when viewed from above,
a first angle is formed by one end of the limit wall, the center of the shaft, and the other end of the limit wall;
a second angle is formed by one side of the beak, the center of the shaft, and the other side of the beak; and
a third angle is formed by one side and the other side of the stopper block;
wherein the first angle is 3 to 4 times larger than the second angle,
and the first angle is 3 to 4 times larger than the third angle.

4. The security robot with image stabilization function of claim 1, further comprising:
first and second stand blocks installed on an upper part of the turn plate;
a tilting motor installed on the first stand block;
a tilting block bracket rotatably installed with one end connected to the tilting motor and the other end connected to the second stand block;
an image camera installed on the tilting block bracket; and
a gyro sensor installed on the second stand block to measure a directional change of the second stand block,
wherein, while an absolute tilt value of the tilting block bracket is set so that the image camera observes a target, the tilting motor is operated in a direction opposite to a first tilt value measured by the gyro sensor so that the tilt of the image camera converges to the set absolute tilt value.

5. The security robot with image stabilization function of claim 4,
further comprising an angle sensor installed on the second stand block for measuring a second inclination value when the tilting block bracket is tilted with respect to the second stand block;
wherein the preset tilt absolute value of the tilting block bracket is determined based on the second inclination value and the first inclination value measured by the gyro sensor.

6. The security robot with image stabilization function of claim 4,
further comprising a thermal imaging camera installed on the tilting block bracket for measuring an object temperature.

7. The security robot with image stabilization function of claim 4,
further comprising a weight balance installed on the tilting block bracket such that a tilt center of the tilting block bracket coincides with or minimizes deviation from its center of gravity.

8. The security robot with image stabilization function of claim 5,
further comprising a weight balance installed on the tilting block bracket such that a tilt center of the tilting block bracket coincides with or minimizes deviation from its center of gravity.

9. The security robot with image stabilization function of claim 6,
further comprising a weight balance installed on the tilting block bracket such that a tilt center of the tilting block bracket coincides with or minimizes deviation from its center of gravity.

* * * * *